United States Patent

Takehara et al.

[11] Patent Number: 5,640,313
[45] Date of Patent: Jun. 17, 1997

[54] INVERTER UNIT

[75] Inventors: Takao Takehara, Iwata-gun; Masashi Norizuki, Kogawashinmachi; Atsuyoshi Tamagawa, Hamatsu, all of Japan

[73] Assignee: Minebea Co., Ltd., Japan

[21] Appl. No.: 622,370

[22] Filed: Mar. 27, 1996

[30] Foreign Application Priority Data

Mar. 31, 1995 [JP] Japan ................ 7-076648

[51] Int. Cl.$^6$ ................ H02M 3/335
[52] U.S. Cl. ................ 363/21; 363/173; 315/DIG. 7
[58] Field of Search ................ 363/21, 173; 315/DIG. 7

[56] References Cited

U.S. PATENT DOCUMENTS

| | | | |
|---|---|---|---|
| 5,036,254 | 7/1991 | Shimizu | 315/DIG. 7 |
| 5,331,532 | 7/1994 | Iwai et al. | 363/21 |
| 5,349,514 | 9/1994 | Ushiki et al. | 363/21 |
| 5,406,468 | 4/1995 | Booth | 363/21 |
| 5,440,473 | 8/1995 | Ishii et al. | 363/21 |
| 5,490,052 | 2/1996 | Yoshida et al. | 363/21 |

*Primary Examiner*—Stuart N. Hecker
*Attorney, Agent, or Firm*—Staas & Halsey

[57] ABSTRACT

The present invention is disclosed to provide an inverter allowing a remarkable reduction in the number of parts used for an inverter unit which can improves the efficiency and allows current control in a wide range.

Namely, the inverter unit for converting a direct current supplied from DC power supply, into an alternating current by conversion means alternatively converting the flowing direction of direct current by SWITCH ON/SWITCH OFF operation of a switching element, comprises a series resonance circuit formed at the primary side of a step-up transformer, a control means for switching ON/OFF said series resonance circuit by the switching element at a timing led in phase from the resonant frequency of this resonance circuit, and a load connected at the secondary side of the transformer, so as to solve the problems described above.

5 Claims, 7 Drawing Sheets

FIG. 5(a)
WHEN THE LAMP CURRENT IS LARGE

FIG. 5(b)
WHEN THE LAMP CURRENT IS SMALL

INVERTER UNIT

BACKGROUND OF THE INVENTION

1. Field of the Invention

The present invention relates to an inverter unit for supplying power to a load for which a wide range of current control is required, and especially to an inverter unit preferably applied to a lighting device for lighting a cold fluorescent light (hereinafter referred as CFL) capable of dimming, known as a high frequency lighting.

2. Description of the Prior Art

Figure 8:
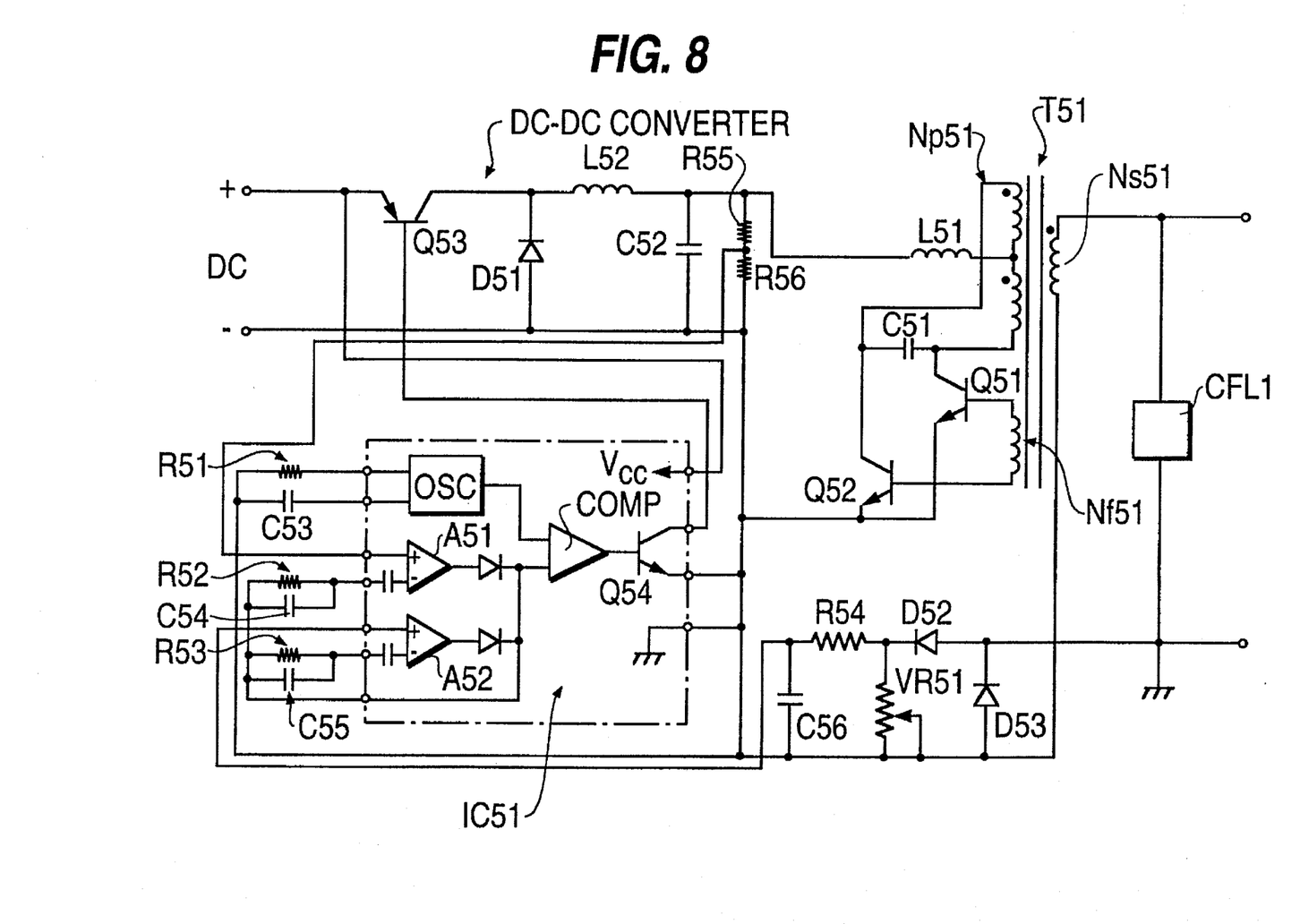
FIG. 8 is a circuit illustrating a conventional example

The inverter unit is a device for converting DC power into AC power, and has been used, as so called a reverse converter, for various electric devices. FIG. 8 is a circuit showing a conventional inverter unit used for an electric discharge tube. In FIG. 8, T51 is a step-up transformer for Royer oscillation circuit provided with a primary coil Np51, a secondary coil Ns51, and a feedback coil Nf51. Q51 and Q52 are NPN transistors for a switching operation, both incorporated together with the step-up transformer T51 into the Royer oscillation circuit. C51 is a capacitor for voltage resonance, and L51 is a choke coil. In this configuration, when the transistors Q51, Q52 are both in suitch off state, the voltage between the collector and emitter has a shape of sine-wave, and the voltage waves for both primary coil Np51 and secondary coil Ns51 of transformer T51 are also shaped in sine-wave. The choke coil L51 is connected to DC-DC converter described later, and CFL1 is connected to the output of step-up transformer T51. A high voltage in sine-wave is output at a frequency of tens of KHz units by the self-excited oscillation of this inverter unit, and then the cold fluorescent light CFL1 lights on. IC51 is an integrated circuit(IC) for controlling the base circuit of PNP transistor Q53 for the switching operation forming DC-DC converter, and operates as a step-down type chopper circuit.

This IC comprises an oscillator OSC for generating a triangular wave, two operational amplifiers A51, A52 for comparison, a PWM comparator COMP for comparing the output voltage of oscillator OSC with of either one of operational amplifiers A51 or A52, and an output transistor Q54 which is driven by this PWM comparator and drives said base of PNP transistor Q53 for the switching operation. In this IC, there are two operational amplifiers A51, A52 connected to another input circuit of PWM comparator for comparing with the oscillator OSC as described above, though, a higher voltage among the output voltages of these two operational amplifiers is compared with the output of oscillator OSC. The IC having the configuration described above is herein defined as an IC for controlling DC-DC converter, and it will be also referred as the IC for controlling DC-DC converter unless the internal configuration changes, even if it was used for other applications. D51 is a flywheel diode, and L52 is a choke coil. C52 is a capacitor, and the choke coil L52 and capacitor C52 form LC filter. C53 and R51 are a capacitor and a resistor, respectively, for determining the oscillation frequency, and R52, C54, R53 and C55 are a C-R element for the phase correction of operational amplifiers A51, A52 in IC51 for controlling DC-DC converter. Diodes D52 and D53 are provided to rectify the positive element of discharge current flowing into CLF1. R54 and C56 are a resistor and a capacitor forming a low-pass filter for shaping the current wave into a direct current. This filter output is connected to the (+)input terminal of operational amplifier A52 in IC51.

Figure 9:
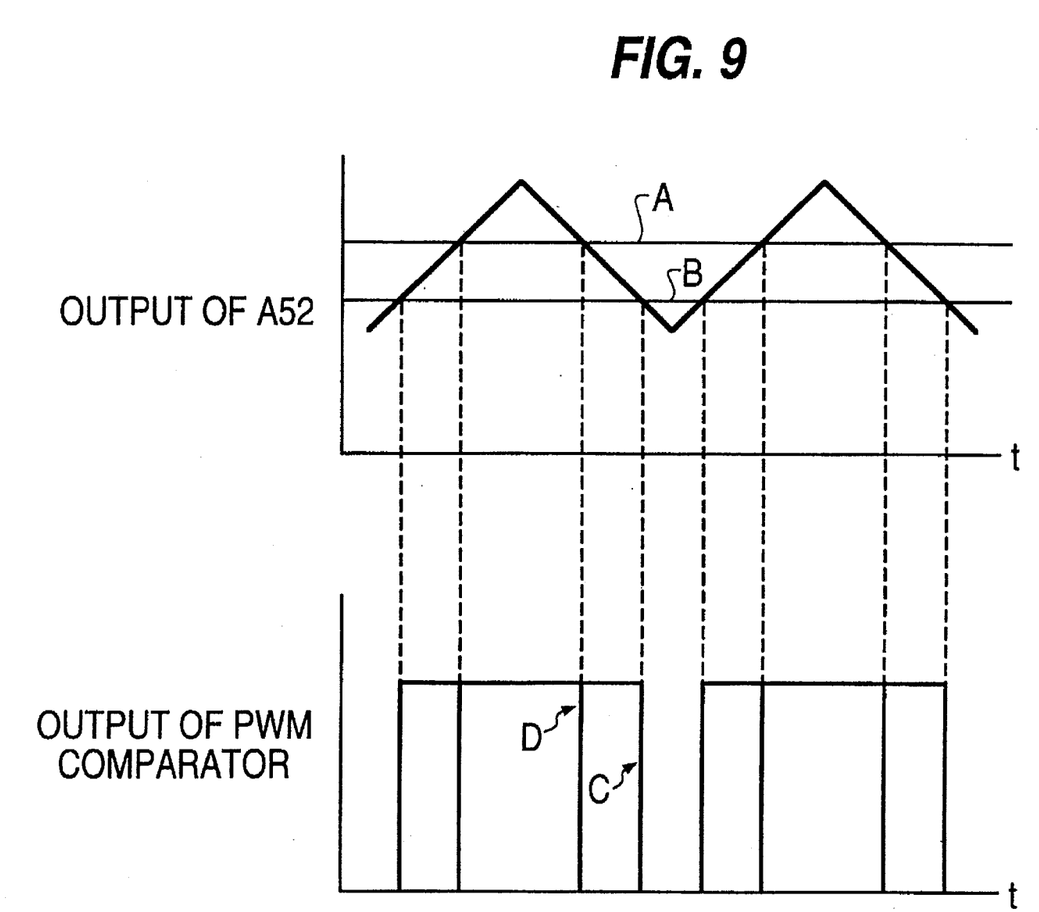
FIG. 9 is a diagram of wave forms illustrating the PWM operation of conventional example.

Namely, voltage proportional to the average for the positive cycle of discharge current is obtained, and this voltage is compared in the operational amplifier A52 with the internal reference voltage of IC51, and an output voltage proportional to the difference between both voltages is obtained. As shown in FIG. 9, this output voltage and the triangular wave output of oscillator OSC in IC51 are compared by PWM comparator. Namely, when the discharge current increases by any cause, the output voltage of operational amplifier A52 which is in error amplification, shifts from B line to A line. Consequently, the output of PWM comparator changes from C line to D line. Namely, a period of time in switch on state for the switching PNP transistor Q53 which is an output transistor, is shorter, and the output voltage of DC-DC converter decreases, and then the supply voltage of Royer oscillation circuit drops, so the discharge current decreases. Therefore, constant-current control for the discharge current is achieved. R55 and R56 are resistors for constant-regulating the output voltage of DC-DC converter, and these are one for detecting DC-DC converter output voltage, in order to constant-regulate the voltage of secondary coil Ns51 of step-up transformer T51, when CFL1 is not connected, or before the discharge starts. A connection point of the resistors R55, R56 is connected to the (+) input terminal of operational amplifier A51 in IC51 to form a negative feedback loop, so as to constant-regulate the output voltage of DC-DC converter. The outputs of operational amplifiers A51, A52 are OR-connected, such that higher one among the output voltages of operational amplifiers A51, A52, is preferentially input into PWM comparator.

It is well known that such a conventional inverter unit described above has a limitation in power conversion efficiency. Because, the total efficiency η of inverter unit is given as:

η=(efficiency of converter portion) * (efficiency of inverter portion)

In order to improve the total efficiency η, it is required to improve each efficiency. For instance, the major causes of the decrease in efficiency for the DC-DC converter are the switching losses by the switching transistor Q53 and the diode D51, and the copper loss by the choke coil L52. Therefore, these losses can not be completely eliminated. The conventional inverter unit has a number of parts, so it is very difficult to reduce the inverter unit in size and price.

The present invention is proposed to overcome the conventional problems described above, and has an object to provide an inverter allowing reduction in the number of parts used for an inverter unit which can improves the efficiency and allows current control in a wide range.

SUMMARY OF THE INVENTION

In order to solve the problems described above, the present invention provides the following quasi class-E voltage resonance type inverter unit. Namely, an inverter unit for converting a direct current supplied from DC power supply, into an alternating current by conversion means alternatively converting the flowing direction of direct current by SWITCH ON/SWITCH OFF operation of a switching element, comprises a series resonance circuit formed at the primary side of a step-up transformer, a control means for switching ON/OFF said series resonance circuit by the switching element at a timing led in phase from the resonant frequency of this resonance circuit, and a load connected at the secondary side of the transformer. The inverter unit is characterized in that a detection means for measuring the load is further provided at the secondary side of the transformer described above, such that said control means can control the said switching element to lead SWITCH ON/SWITCH OFF timing of the leading phase faster when it is found the load is smaller upon receipt of signal from said detection means, and said load can be a cold fluorescent light.

Further, a feedback coil is provided at the step-up transformer, and when the cold fluorescent light is not connected, or before the discharge starts, the voltage of feedback coil is returned as a negative feedback to the operational amplifier of said control means, such that the output voltage of transformer is kept constant, or when the cold fluorescent light is not connected, or before the discharge starts, the voltage of the primary coil is returned as the negative feedback to the operational amplifier, such that the output voltage of the transformer is kept constant.

Since the inverter unit according to the present invention is a quasi class-E voltage resonance type inverter, it can be configured by single piece of power switching element, and when compared with other inverters utilizing a basic quasi class-E voltage resonance circuit, an inductor and a capacitor can be omitted, so as to allow the high efficiency and the drastic reduction for the number of parts used.

DESCRIPTION OF THE PREFERRED EMBODIMENT(S)

Figure 1:
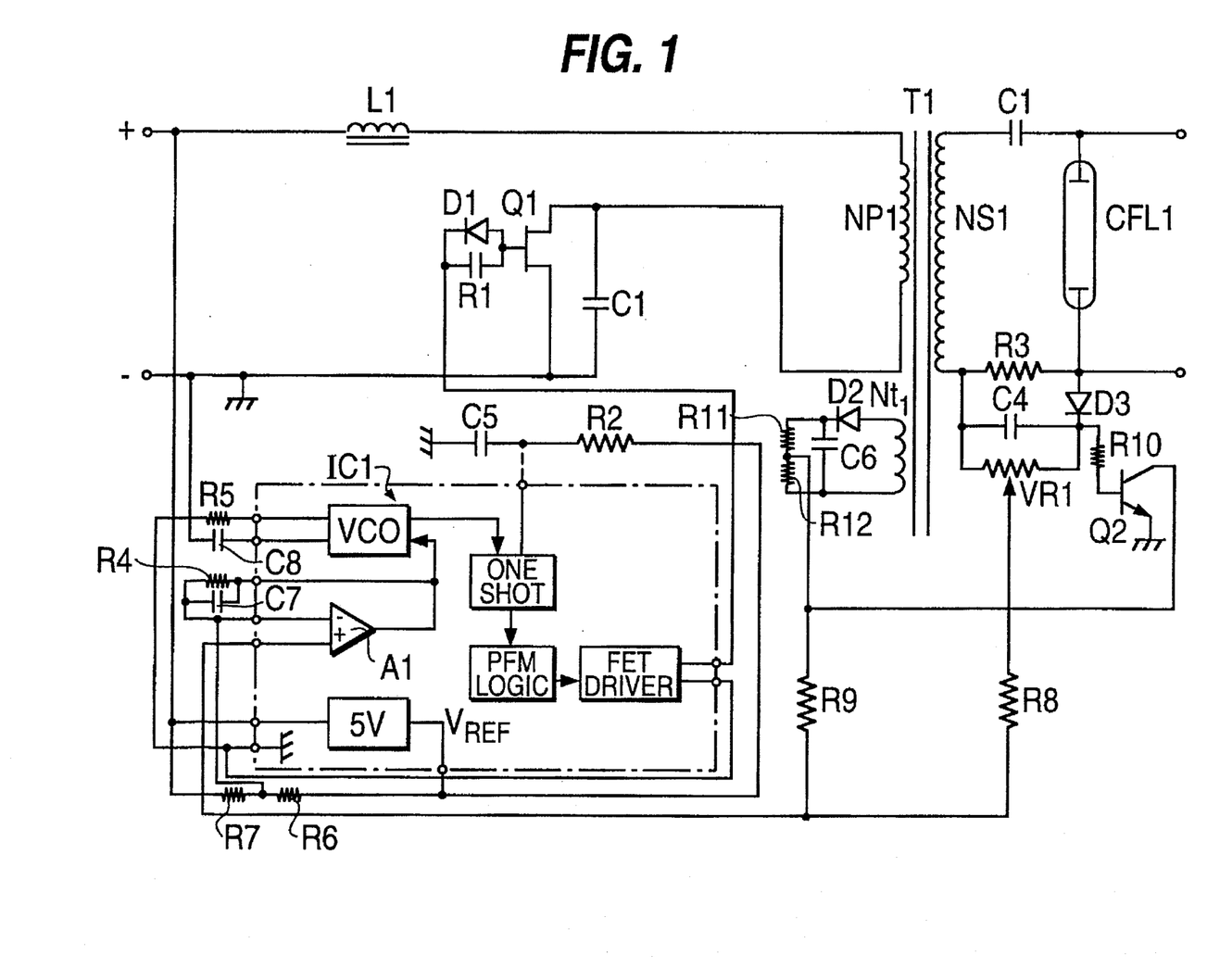
FIG. 1 is a circuit illustrating one embodiment according to the present invention.

One embodiment according to the present invention will be now described in detail by reference with the accompanying drawings. FIG. 1 is the circuit of an inverter unit employing a cold fluorescent light CFL1 as a load. As seen in FIG. 1, in the present invention, a circuit having power MOSFET Q1, a choke coil L1 and a capacitor C1 for voltage resonance, is operated as a quasi class-E voltage resonance type inverter. A high frequency AC voltage generated by this inverter is boosted by a step-up transformer T1 to directly drive CFL1. This inverter is known as an inverter capable of producing a sine wave output, since current flowing through a power switching element and voltage applied to a switch, form together a part of sine wave.

Figure 2:
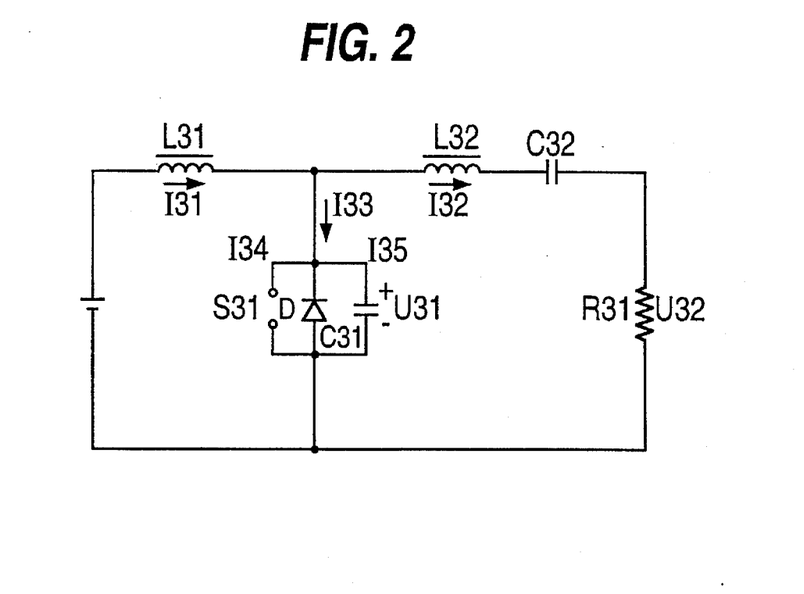
FIG. 2 is a circuit illustrating a quasi class-E operation.

The principle of operation for the quasi class-E voltage resonance type inverter will be now described as below with FIG. 2. FIG. 2 is a basic circuit for the quasi class-E voltage resonance type inverter. In this drawing, a reactor L31 is a choke coil, and its current is approximately a direct current I31. An inductor L32 and a capacitor C32 form a resonance circuit. Voltage shaped in pulse by ON/OFF operation of a switch S31, is applied to a tuning circuit composed of the inductor L32, capacitor C32 and a resistor R31. Assuming that SWITCH ON/SWITCH OFF frequency of the switch S31, that is, the switching frequency is a frequency slightly higher than the resonant frequency of the inductor L32 and capacitor C32, the current I32 flowing through said tuning circuit is approximately a sine wave. In this case, said tuning circuit has an inductive reactance, so the current flowing through said tuning circuit lags in phase against voltage. The current I33 of a series circuit composed of a diode D31, a capacitor C31 and the switch S31, is also a sine wave, since it is given as I31=I32+I33, thus I32 is a sine wave.

Figure 3A:
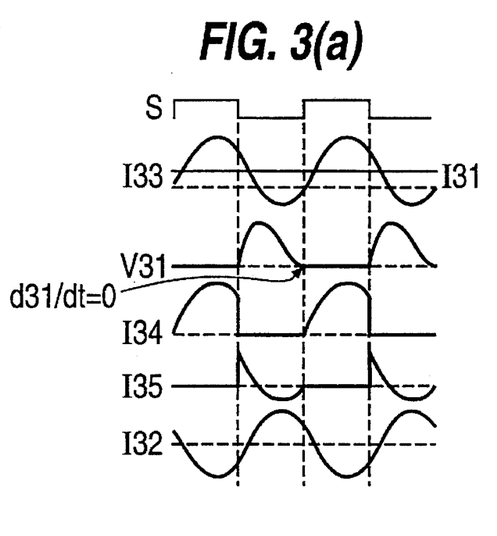
FIGS. 3a and 3b are diagrams of wave forms illustrating the quasi class-E operation.
Figure 3B:
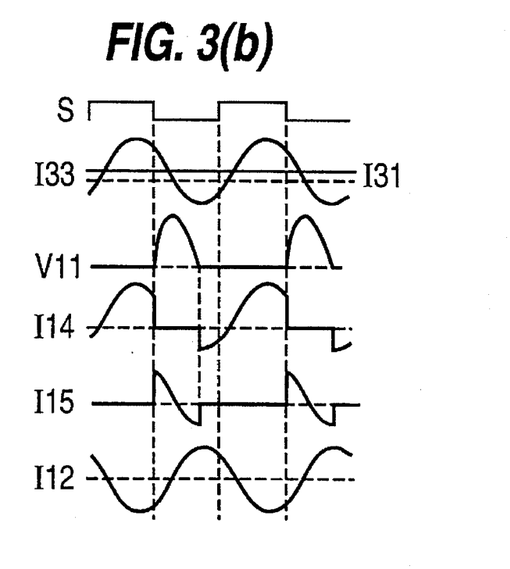

FIG. 3(a) illustrates operating waves of the class-E resonance inverter operated at 50% duty factor of switch. When the switch S31 is turned off, the current of sine wave flows through the capacitor C31, and the capacitor C31 is charged by the current I35, and then voltage V31 rises up in a shape of sine wave from zero. Therefore, turning off the switch is a zero voltage, and a non-zero current switching. With an optimum load Ropt, as shown in FIG. 3(a), the voltage V31 of switch drops to zero at a slope dV31/dt nearly zero, and when V31=0, and dV31/dt=0, then the switch S31 is turned on. When the load resistance is smaller than the optimum resistance Ropt, as shown in FIG. 3(b), the voltage V31 of switch drops to zero at a sharp slope dV31/dt, and then a parallel reverse diode D31 is SWITCH ON. The voltage V31 of switch is clamped to the zero voltage, while the switch S31 is turned on. This is a quasi class-E operation, so it is a zero voltage switching as well as the voltage resonance switch. When operated as a switching regulator, it can not follow the class-E class over the all variable range of load and input voltage, thus it is a quasi class-E operation. The impedance of R-L-C tuning circuit is sensitive to a switching frequency, so when an output voltage (=I32) is controlled by a switching frequency modulation, there is an advantage of having less change in switching frequency.

Figure 4A:
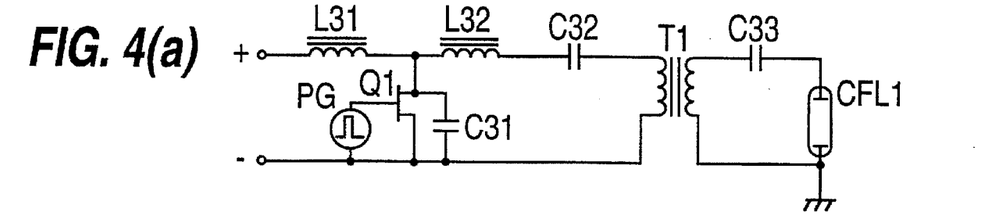
FIGS. 4a–4e are partial circuits illustrating the present invention.
Figure 4B:
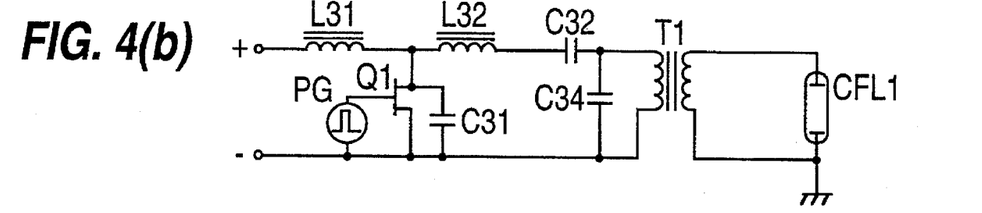
Figure 4C:
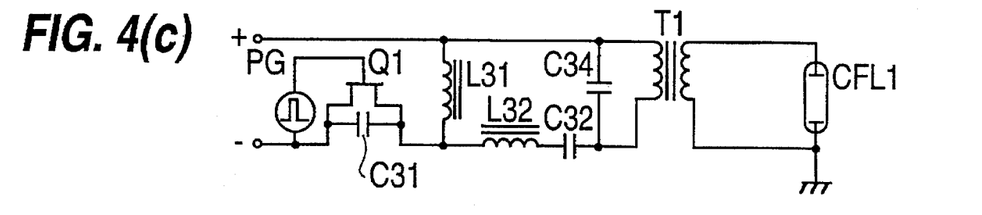
Figure 4D:
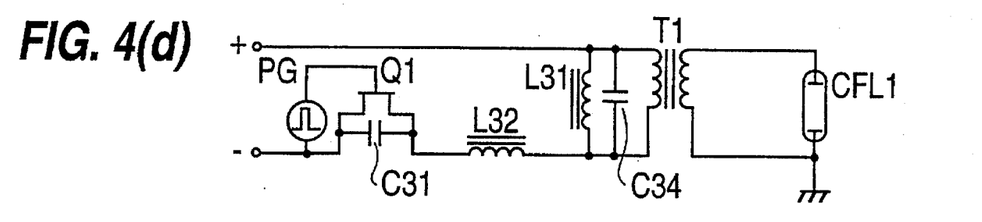
Figure 4E:
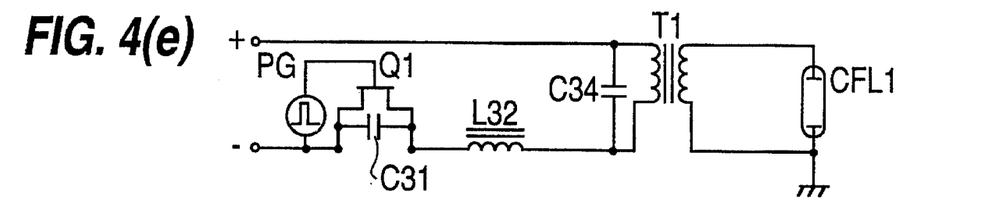

Next, there will be now described about a process deriving the circuit of the present invention from the quasi class-E voltage resonance type inverter basic circuit. FIG. 4(a) illustrates the basic circuit of quasi class-E voltage resonance type CFL inverter. PG is a pulse generator driving a power MOSFET Q1, and C33 is a ballast capacitor. FIG. 4(b) illustrates a circuit in that the ballast capacitor C33 in FIG. 4(a) is converted to the primary side of step-up transformer T1. The step-up ratio of the transformer T1 is assumed to be n, thus a capacitor C34 is C34=n2×C33. Next, the connection point at lower side of both transformer T1 and capacitor C34 is moved from the (−) side of input power supply to the (+) side, then FIG. 4(c) is obtained. Next, the capacitor C32 is included in the capacitor C34, and the lower terminal of choke coil L31 is moved from the left side of resonance inductor L32 to the right side, then FIG. 4(d) is obtained. Next, the choke coil L31 is included in the transformer T1, then FIG. 4(e) is obtained. In this manner, the circuit according to the present invention was derived.

In FIG. 1 illustrating an embodiment according to the present invention, a step-up transformer T1 is provided with a primary coil Np1, a secondary coil Ns1 and a feedback coil Nf1. Q1 is a power MOSFET with N channel. A series combined inductance of a coil L1 and the leakage inductance Lg of transformer T1, and a series combined capacitance of capacitors C1 and C3, form a resonance circuit, and CFL1 is connected in series to the resonance circuit. The resonant frequency FR of said resonance circuit is given as:

$$FR = \frac{1}{2\pi\sqrt{(L1+Lg)\frac{(C1\times C3)}{(C1+C3)}}}$$

However, C3 is a transformer primary reduced value of ballast capacitor C2, thus given as C3=n²×C2. "n" is the step-up ratio of step-up transformer T1. C1 is a voltage resonance capacitor. When the power MOSFET Q1 is in OFF state, the voltage between the drain and source has a shape of sine wave by means of the choke coil L1 and capacitor C1 for voltage resonance. IC1 is an IC for a voltage resonance type switching, controlling the gate circuit of power MOSFET Q1. This IC comprises a voltage controlled oscillator (VCO), an operational amplifier A1, a pulse frequency modulation circuit (PFM) and a FET DRIVER which is driven by this PFM circuit and drives the gate of power MOSFET Q1. R4, C7 are are sistor and a capacitor for the phase correction of the operational amplifier A1 incorporated into IC1 which is an IC for the voltage resonance type switching. R5, C8 are a C-R element for the switching frequency determination of the voltage controlled oscillator (VCO) incorporated in said IC1. R6, R7 are resistors for DC bias for the (−) input terminal of operational amplifier A1 incorporated in said IC1. R1 is the gate drive resistor of power MOSFET Q1. D1 is a speed-up diode for tripping a gate storage charge. A lamp current is detected by a resistor R3, and the positive cycle of the lamp current Is detected by a diode D3 and a capacitor C4, then converted into a direct current. The output is input into the (+) input terminal of operational amplifier A1 in said IC1 through a variable resistor VR1 for setting the lamp current and a resistor R8. Namely, voltage proportional to the average for the positive cycle of discharge current is obtained at the center tap of variable resistor VR1, and this voltage is compared in the operational amplifier A1 with an internal reference voltage of IC1, and an output voltage proportional to the difference between both voltages is obtained. This output voltage which is connected to the input terminal of voltage controlled oscillator(VCO), controls the resonant frequency of the oscillator (VCO). Namely, as the discharge voltage increases by any cause, the output of operational amplifier A1 rises up, and then the oscillating frequency of the oscillator (VCO) also rises up. A monostable multivibrator (ONESHOT) is set at a leading time for the output of the oscillator (VCO), so the output is at a high level. A resistor R2 and a capacitor C2 are provided for determining the output pulse width of the multivibrator (ONESHOT), and the width is kept constant by the time constant.

Figure 5A:
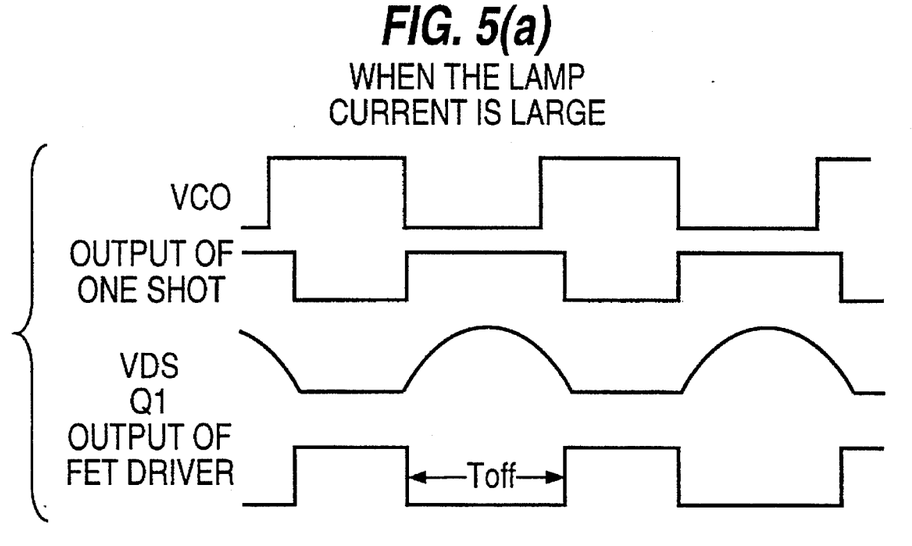
FIGS. 5a and 5b are diagrams of wave forms illustrating the operation of the present invention.
Figure 5B:
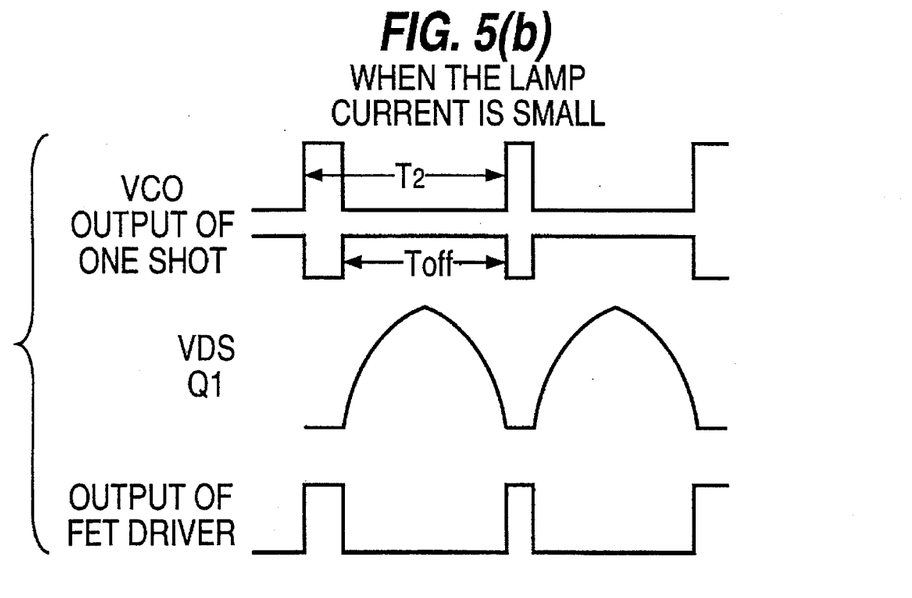

Toff in FIG. 5(b) is set so as to satisfy the quasi class-E operation in consideration of changes in resonant frequency caused by a variation in electric parts such as the choke coil L1, the primary inductance of step-up transformer T1, and the capacitor C1 for voltage resonance, and a change in temperature. Namely, as shown in FIG. 5, the resonant frequency rises up while said Toff is kept constant, so a period of time for the switch in turn-ON state decreases, thus the current supplied to CFL1, decreases, then the constant current control is maintained. As the lamp current decreases, the output of operational amplifier A1 drops, thus the resonant frequency of the oscillator (VCO) drops, then the constant current control is achieved.

In order to keep the discharge current constant (constant current control) when the input voltage changes, or for dimming the discharge current, a pulse frequency modulation (PFM) is employed, such that the operating range of inverter can be more widely expanded, compared with a pulse modulation (PWM).

Figure 6:
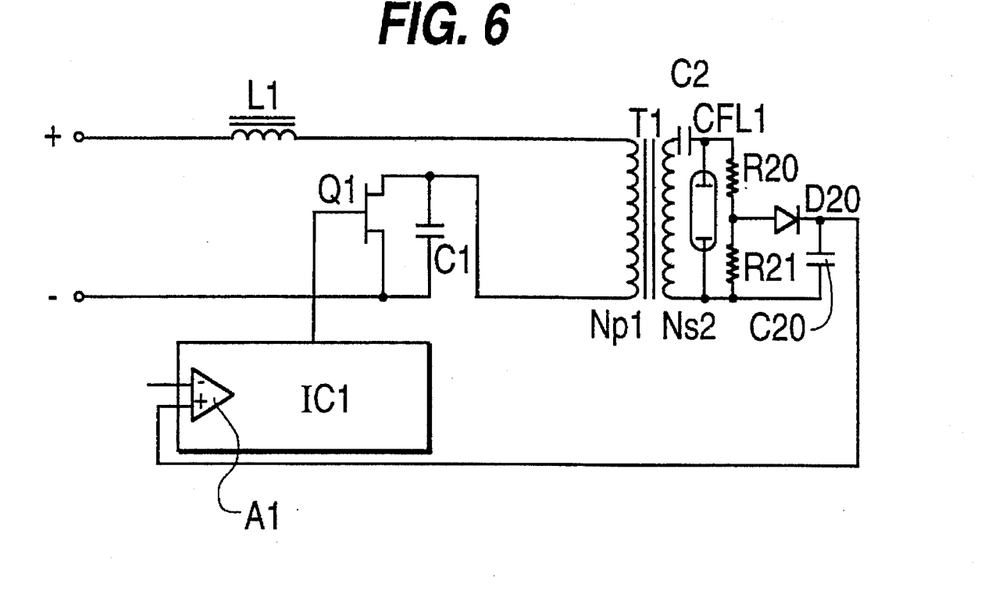
FIG. 6 is a circuit illustrating a method of setting the open circuit voltage of the present invention.

A high voltage on the order of about 1 KV is required to apply to CFL in order to allow it to start the discharge. This is called an open circuit voltage. It is considered as a method of setting said open circuit voltage, that as shown in FIG. 6, the voltage of secondary coil Ns1 in the step-up transformer T1, is divided by resistors R20, R21, and rectified by a diode D20 and a capacitor C20, and then applied to the (+) input terminal of operational amplifier A1 in IC1 which is a voltage resonance type switching IC. However, there are disadvantages of an increase in instability for the negative feedback loop due to a constant, when a high voltage resistant resistor r20 is required, and a phase lagging by R20, D20 and C20 occurs. In order to solve this problems, as shown in FIG. 1, a feedback coil Nf1 is provided at the step-up transformer T1, and the voltage of this feedback coil Nf1 is rectified by a diode D2 and a capacitor C6, and divided by resistors R11, R12, then input into the (+) input terminal of operational amplifier A1 in said IC1 through a resistor R9 for the feedback. It is assumed that the turns of secondary coil Ns1 and the voltage are Ns and Vs, respectively, and the turns of feedback coil Nf1 and the voltage are Nf and Vf, respectively, then the voltage Vs of secondary coil Ns1 is given as Vs=(Ns/nf)Vf, so Vs can be kept constant by keeping Vf constant without regard to the value of DC voltage input. Also, since the voltage Nf may be the same level as the input voltage of operational amplifier A1, the voltage is not required to be high, and no phase lagging occurs.

The collector of switching transistor Q2 is connected to the connection point of resistors R9, R11 and R12. Since the terminal voltage of a capacitor C4 is 0 V when CFL1 is not connected, or before the discharge starts, the switching transistor Q2 is in turn-OFF state. Therefore, the voltage of secondary coil Ns in the step-up transformer T1 is kept constant by means of the negative feedback performed with resistors R9, R11 and R12, and the operational amplifier A1, without regard to the input voltage. The voltage of a capacitor C4 is set at a voltage higher than 0.7 V, while CF L1 is connected and the discharge current flows, such that the switching transistor Q2 is in turn-ON state, and the constant current operation with the resistor R11, R12 is interrupted, thus only the constant current control by the operational amplifier A1 is available.

Figure 7:
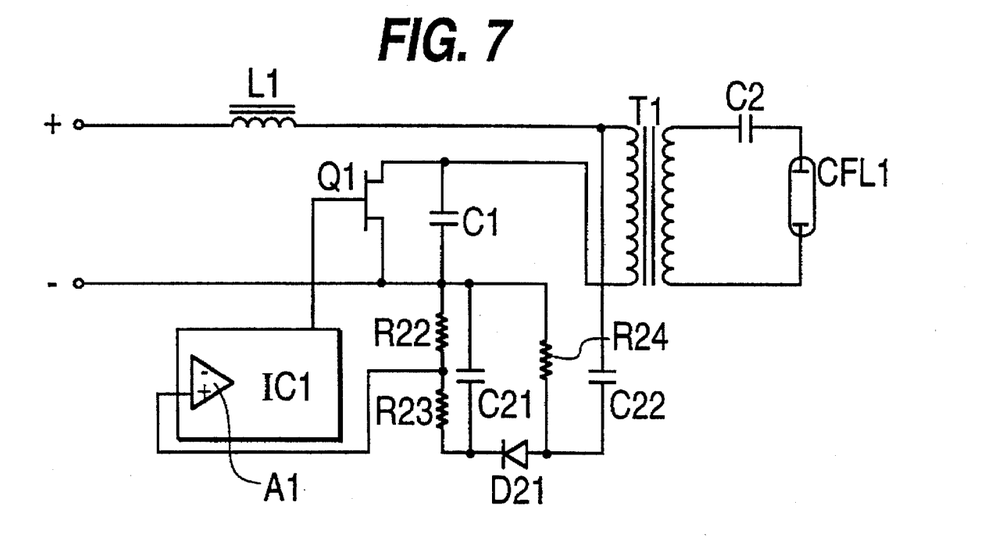
FIG. 7 is a circuit illustrating the embodiment of the method for setting the open circuit voltage of the present invention.

As a method of setting said open circuit voltage, an embodiment shown in FIG. 7 can be picked up. As shown in FIG. 7, the voltage of primary coil Np1 in the step-up transformer T1 may be detected by a capacitor C22 and a resistor R24, and rectified by a diode D21 and a capacitor C21, and divided by resistors R22 and R23, to be input into the operational amplifier A1 of said IC1.

The inverter unit according to the present invention employs a quasi class-E voltage resonance type inverter, so the inverter unit can be configured by single power switching element, and show a high efficiency. Since this is operated by single inverter, a large number of parts to be used can be remarkably reduced, so as to reduce the whole inverter unit in dimension, and in addition to this, cost down for the production can be realized, since one for each choke coil and capacitor can be omitted, compared with the quasi class-E voltage resonance type inverter basic circuit.

What is claimed is:

1. A quasi class-E voltage resonance type inverter unit for converting DC power supplied from DC power supply into AC power by means of a switching element, comprising:
    a step-up transformer which the primary current is intermitted by the switching element;
    a series resonance circuit connected to the primary side of the step-up transformer including the primary coil of the step-up transformer, inductor connected to the primary coil in series, and a capacitor connected in parallel to the switching element connected in series to the step-up transformer; and a control means for intermitting the switching element at a frequency higher than the resonant frequency of the series resonance circuit.

2. The inverter unit according to claim 1, wherein a detection means for measuring the load is provided at the secondary side of said step-up transformer, such that said control means can control said switching element to raise the switching frequency higher when it is found the load is smaller upon receipt of signal from said detection means.

3. The inverter unit according to claim 1, wherein said load is a cold fluorescent light.

4. The inverter unit according to claim 3, wherein a feedback coil is provided at the step-up transformer, and when the cold fluorescent light is not connected, or before a discharge starts, a voltage of feedback coil is returned as a negative feedback to an operational amplifier of said control means, so that the output voltage of step-up transformer is stabilized.

5. The inverter unit according to claim 3, wherein when the cold fluorescent light is not connected, or before a discharge starts, a voltage of primary coil is returned as a negative feedback to an operational amplifier of said control means, so that the output of step-up transformer is stabilized.

* * * * *